US012711192B2

(12) United States Patent
Gazit et al.

(10) Patent No.: US 12,711,192 B2
(45) Date of Patent: Aug. 18, 2026

(54) SYSTEM AND METHOD FOR NEAR REAL TIME WEB SCRAPING

(71) Applicant: Karma Shopping Ltd., Tel Aviv (IL)

(72) Inventors: Omer Gazit, Hod HaSharon (IL); Yuval Hoch Ronen, Tel Aviv (IL)

(73) Assignee: Karma Shopping Ltd., Tel Aviv (IL)

( * ) Notice: Subject to any disclaimer, the term of this patent is extended or adjusted under 35 U.S.C. 154(b) by 361 days.

(21) Appl. No.: 17/821,861

(22) Filed: Aug. 24, 2022

(65) Prior Publication Data

US 2024/0070218 A1 Feb. 29, 2024

(51) Int. Cl.
*G06F 16/957* (2019.01)
*G06F 16/951* (2019.01)
*G06F 16/958* (2019.01)

(52) U.S. Cl.
CPC ........ *G06F 16/9577* (2019.01); *G06F 16/951* (2019.01); *G06F 16/972* (2019.01)

(58) Field of Classification Search
CPC ... G06F 16/9577; G06F 16/972; G06F 16/951
USPC .......................................................... 715/234
See application file for complete search history.

(56) References Cited

U.S. PATENT DOCUMENTS 7,072,890 B2 7/2006 Salerno et al.
7,647,351 B2 1/2010 Monsarrat
9,148,467 B1 9/2015 Colton et al.
9,385,928 B2 7/2016 Petta et al.
10,601,948 B1 3/2020 Juravicius et al.
10,965,770 B1 3/2021 Vilcinskas et al.
11,196,712 B1 12/2021 Norbutas
11,204,971 B1 * 12/2021 Vilcinskas .......... H04L 63/0807
11,212,354 B1 * 12/2021 Pilkauskas ............ H04L 67/306
2011/0038470 A1 * 2/2011 Kent ..................... H04M 15/06
379/142.04
2012/0303697 A1 * 11/2012 Alstad ................. G06F 16/9574
709/203
2017/0012861 A1 * 1/2017 Blumenthal ............ H04L 45/24
2022/0070272 A1 * 3/2022 Vasiliauskas ....... H04L 67/1031

OTHER PUBLICATIONS

H. Lan et al., "COVID-Scraper: An Open-Source Toolset for Automatically Scraping and Processing Global Multi-Scale Spatiotemporal COVID-19 Records," in IEEE Access, vol. 9, pp. 84783-84798, 2021, doi: 10.1109/ACCESS.2021.3085682. (Year: 2021).*

* cited by examiner

*Primary Examiner* — Matthew Ell
*Assistant Examiner* — Nicholas Hasty
(74) *Attorney, Agent, or Firm* — M&B IP Analysts, LLC

(57) ABSTRACT

A system and method perform near real time scraping of a web page to generate a modified web page. The method includes receiving a uniform resource locator (URL) request directed at a web server; detecting in the URL request a textual resource and a non-textual resource; generating a request for the textual resource over a first network path including a first determined latency; generating a request for the non-textual resource over a second network path including a second determined latency, which is greater than the first determined latency; receiving the textual resource and the non-textual resource; scraping data from the textual resource; and generating a modified web page based on the scraped data, the textual resource, and the non-textual resource.

25 Claims, 5 Drawing Sheets

SYSTEM AND METHOD FOR NEAR REAL TIME WEB SCRAPING

TECHNICAL FIELD

The present disclosure relates generally to web information technology, and specifically to providing near real time web scraping.

BACKGROUND

The largest infrastructure powering information technology is the Internet. A large portion of content consumed by users through the internet is provided by accessing web pages. A web page is a hypertext document which is accessible via a web server, and displayed on a web browser application. A web page is a web resource which includes a text document and can be accessed via a uniform resource locator (URL). The text document includes a text content of a web page, and may reference other resources, such as additional URL links, images, videos, and the like. A web page may further include JavaScript, Cascading Style Sheets (CSS), and the like.

Web pages are used to provide users with information through web browsers and allow users to interact with digital content. For example, web pages are used for commercial web sites such as eBay®, Amazon.com®, Walmart.com®, and the like.

Web browsers are software applications, often installed on client devices, which receive hypertext files and use instructions from the hypertext file to render visualizations on a display of the client device. Many web browsers allow users to customize the browser software application, by adding functionality through plugins. Some plugins allow removing certain content, such as advertisement blockers (ad blocks), while others add content to augment the content that users consume.

Due to a large volume of information accessible as web pages, an industry of collecting that information has emerged, known as web scraping. Web scraping refers to applications which request we pages in order to retrieve data from a web page, parse the data and store it in a predetermined format. The stored data can then be used for analytics, price comparison, machine learning training data, aggregating information, lead generation, and so much more.

While web scraping is a valuable tool for some, it drains resources of a web server, as every scraping application (e.g., bot or crawler) which it services is at least one less user the web server can provide service to. Therefore, web servers will often attempt to curtail scraping activity.

For websites which attempt to scrape data and present it to users this is a challenge. Straightforward methods of scraping will often trigger a response from a web server to block the scraping attempt. For example, Node.js® provides a JavaScript® environment which executes JavaScript code outside of a web browser. Node.js may be utilized to run Puppeteer®, which is a Node library providing an application programming interface (API) which allows automating actions in a Google® Chrome® or Chromium® environment. Most actions which can be performed manually in a browser can be programmed to be performed, for example in Chrome through Puppeteer. However, various techniques can be employed by web servers in an attempt to block web scraping, rendering such techniques less effective.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for near real time scraping of a web page to generate a modified web page. The method comprises: receiving a uniform resource locator (URL) request directed at a web server; detecting in the URL request a textual resource and a non-textual resource; generating a request for the textual resource over a first network path including a first determined latency; generating a request for the non-textual resource over a second network path including a second determined latency, which is greater than the first determined latency; receiving the textual resource and the non-textual resource; scraping data from the textual resource; and generating a modified web page based on the scraped data, the textual resource, and the non-textual resource.

Certain embodiments disclosed herein also include a non-transitory computer readable medium having stored thereon causing a processing circuitry to execute a process, the process comprising: receiving a uniform resource locator (URL) request directed at a web server; detecting in the URL request a textual resource and a non-textual resource; generating a request for the textual resource over a first network path including a first determined latency; generating a request for the non-textual resource over a second network path including a second determined latency, which is greater than the first determined latency; receiving the textual resource and the non-textual resource.

scraping data from the textual resource; and generating a modified web page based on the scraped data, the textual resource, and the non-textual resource.

Certain embodiments disclosed herein also include a system for near real time scraping of a web page to generate a modified web page. The system comprises: a processing circuitry; and a memory, the memory containing instructions that, when executed by the processing circuitry, configure the system to: receive a uniform resource locator (URL) request directed at a web server; detect in the URL request a textual resource and a non-textual resource; generate a request for the textual resource over a first network path including a first determined latency; generate a request for the non-textual resource over a second network path including a second determined latency, which is greater than the first determined latency; receive the textual resource and the non-textual resource; scrape data from the textual resource; and generate a modified web page based on the scraped data, the textual resource, and the non-textual resource.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
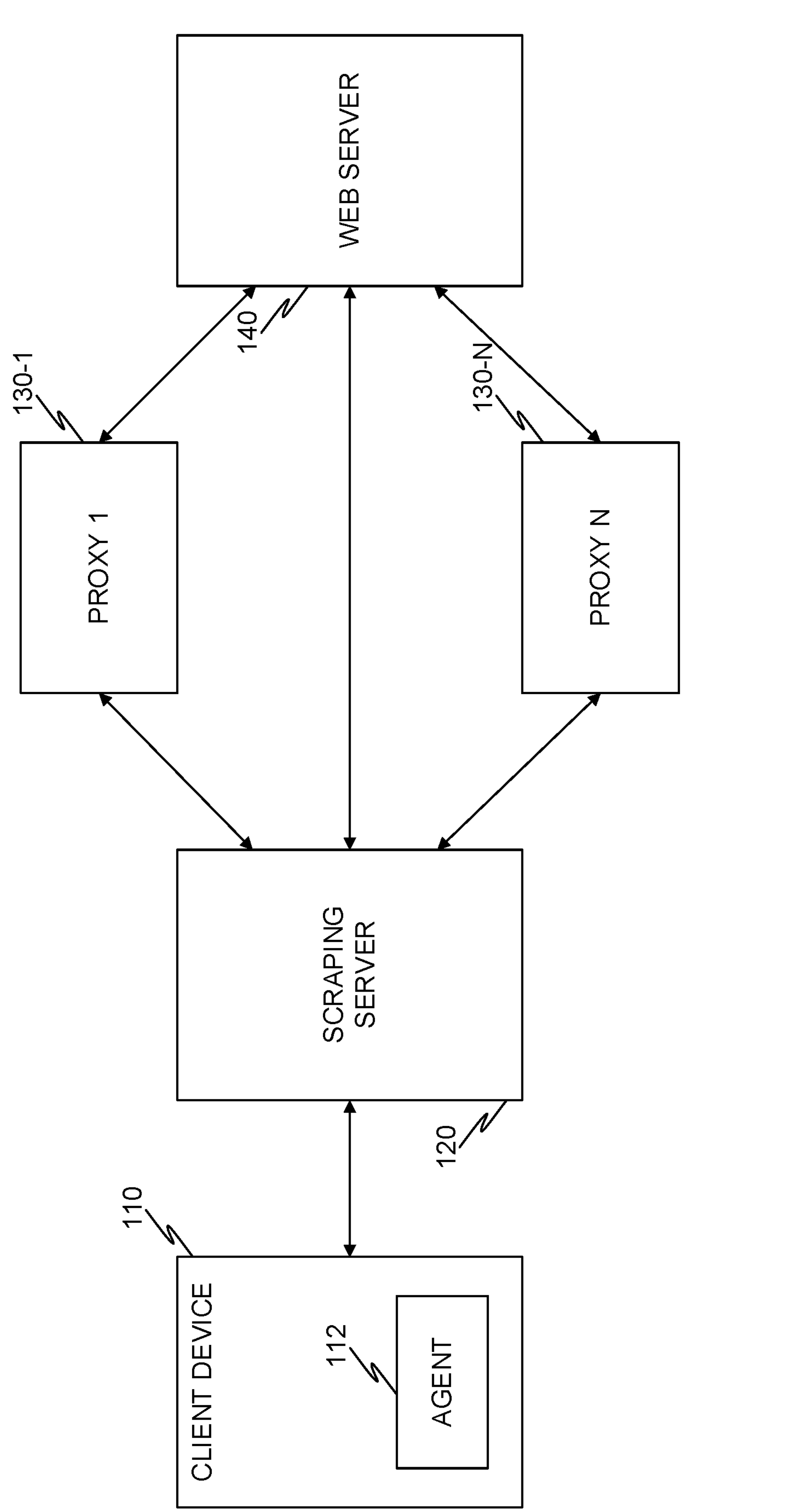
FIG. 1 is a diagram of a scraping server providing content to a client device, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for generating a modified web page having augmented content, based on scraping in near real time of a web page from a web server. Web pages are consumed as content by users using client devices. The client devices communicate with a web server which provides the client devices with web pages, based on uniform resource locator (URL) requests. Often, a user will benefit from additional information which is not supplied by the web server. Some additional information is beneficial for a user to have and may be less beneficial for a content owner to provide. For example, a user shopping on an ecommerce website, benefits from knowing historical price data for an item they user is viewing, while the content owner (i.e., the ecommerce website owner) does not benefit from the user having this information, as it may adversely affect the user's decision to purchase the item.

In order to provide a user with this information, the web page needs to be retrieved from the web server, scraped to detect data, compare the data, for example by querying a database, and generate a modified web page based on the original web page and any additional content or data that is generated as a result of scraping.

However, scraping data is a process which takes time, and is often performed through a proxy server. Proxy servers often change their network address (i.e., IP address) to avoid being blocked by a web server, which might otherwise block unwanted access, such as from a server attempting to scrape a website hosted on the webserver. Therefore, in order to avoid having a scraping server blocked by a web server, the scraping server uses a proxy server.

In order to decrease latency, the system is configured to initiate scraping once the textual content is received, as the non-textual content is not relevant for the purpose of scraping. In an embodiment, a document object model (DOM) may be monitored to determine when a textual content is received, and scraping can begin. In some embodiments, the textual content is received over a first network path having a first latency, and the non-textual content is received over a second network path having a second latency which is greater than the first latency.

Thus, overall latency felt by the user is affected to a minimal degree. In an embodiment, the modified web page is presented to a user (i.e., rendered by the client device) within a few seconds of the client device originating the URL request for the content.

FIG. 1 is an example of a diagram of a scraping server providing content to a client device, implemented in accordance with an embodiment. In an embodiment, a client device 110 is, but is not limited to, a personal computer, a laptop, a tablet computer, a smartphone, a wearable computing device, or any other device capable of receiving and displaying web content. Web content may be, for example, a hypertext document. In an embodiment, the hypertext document includes uniform resource locator (URL) links, which when accessed provide additional resources to a requesting client device. An additional resource is, for example, a hypertext document, a text document, a picture file, a video file, and the like. According to an embodiment a resource accessible by a URL is a digital file. A digital file is, for example, a hypertext markup language (HTML) page, an image file, a video file, a text document (e.g., TXT file, Microsoft® Word™ file), a portable document file (PDF), and the like. In an embodiment, a URL indicates a network-accessible location of a file. For example, a hypertext transfer protocol (HTTP) instruction, such as GET, when executed on a particular URL, will configure a client device 110 to generate an instruction for accessing a network location specified in the URL, and requesting access to a resource specified in the URL.

In an embodiment, the client device 110 includes a software agent 112. The software agent 112 is configured to detect a URL request (i.e., a request for a resource, utilizing the URL) and sending the URL to a scraping server 120. In some embodiments, the client device 110 is configured to access the scraping server 120 and request to download the software agent 112. In an embodiment, the software agent 112 is implemented as a plugin for a web browser application installed on the client device 110. A plugin is a software component that provides additional functionality on top of an existing software application. A web browser application may be, for example, Mozilla® Firefox®, Google® Chrome, Opera®, Safari®, and the like.

In certain embodiments, the scraping server 120 is deployed in a cloud computing environment, for example as a virtual machine, container, and the like. In some embodiments the scraping server 120 is implemented as an on-premises server, using a computer architecture described in more detail below. The scraping server 120 is configured to receive URL requests from client devices, such as client device 110. In an embodiment, the scraping server 120 communicates with a plurality of proxy servers 130-1 through 130-N, generally referenced as proxy servers 130, and individually referenced as proxy server 130, where 'N' is an integer having a value of '2' or greater. For example, the scraping server 120 may be implemented as a virtual machine having an Nginx® web server deployed thereon, which serves as a reverse proxy to forward content received from web servers, such as web server 140, to client devices such as client device 110.

In some embodiments, the scraping server 120 is configured to generate a resource request based on a received URL request. In an embodiment, the scraping server 120 is configured to generate a first request for a text based resource, and a second request for another resource which is not text based. For example, a web page is defined utilizing HTML. The HTML code of the web page includes a textual portion and a media portion, such as an image file. For the purpose of scraping however, the textual portion is more important than the media portion. The scraping server 120 is configured to generate a first request for the textual portion, and a second request for the media portion. In an embodiment, each request may be sent through a different proxy server 130, or directly to a web server 140 on which the web page is hosted. In certain embodiments, the scraping server 120 is configured to determine a first network path response time and a second network path response time to the web server 140. For example, the scraping server 120 may be configured to execute a PING instruction to the web server 140 directly and measure a response time, and executed a PING instruction through a network interface which includes connecting to a proxy server 130 and measure the response time. In some embodiments, the scraping server 120 is configured to determine a response time from a plurality of proxy servers 130.

In an embodiment, the scraping server 120 is configured to fetch a text resource from the web server 140 via a network path having a response time which is faster (i.e., lower response time) than a second network path having a slower response time. In certain embodiments, the scraping server 120 is configured to request another resource, which is not the text resource (e.g., an image file) from the second network path.

This may be advantageous, as it allows to mask at least a portion of network traffic so that it does not seem to be for purpose of scraping. Further, for a web application in which a user wishes to view the scraped data as quickly as possible, this allows to gain some time between the arrival of the textual data and the non-textual data, thus allowing time to perform processing on the textual data if needed.

For example, in an embodiment the agent 112 is configured to generate a modified web page based on a web page requested by the scraping server 120. The client device 110 is configured to request a web page. The scraping server 120 receives the request, which is intercepted, in an embodiment, by the agent 112. The scraping server 120 is configured to generate from the request a first request for a textual resource from the web server 140, and a second request for a non-textual resource. In an embodiment, the second request may be from any one of: the web server 140, from another server, and a combination thereof. The scraping server 120 is configured to send the textual resource and the non-textual resource to the client device 110. In an embodiment, the agent 112 is configured to generate a modified web page based on the received resources.

This is advantageous for example to provide augmented features over the web page. For example, in an embodiment the agent 112 is configured to detect data fields in a textual resource of a web page provided by an ecommerce web server, wherein the data fields may be any one of: item name, item price, item size, item color, item availability (e.g., in stock or not), and the like. In an embodiment the agent 112 is configured to generate instructions which execute queries that are based on a value of a data field. For example, the agent 112 may be configured, in an embodiment, to extract a value for an 'item price' data field detected in the textual resource, and query a database containing therein historic data of item prices. The query may be, for example, to determine whether the extracted value is lower than, higher than, or equal to, an average of the 'item price', whether the extracted value is lower than, higher than, or equal to an 'item price' of the last seven days (or other predetermined time frame), and the like.

This example, and other augmented features, are advantageous to provide, and are possible to provide due to scraping the web page in near real time, performing detection of data fields and their values, performing an action based on those values, and presenting to a user of the client device 110 a modified web page which includes an augmented feature. In an embodiment, an augmented feature is an overlay generated on the web page. In an embodiment, an overlay includes code, for example in HTML, which when executed by the web browser application configures the browser to render a content on top of an original web page, such as the web page provided by the web server 140. In certain embodiments, an augmented feature includes a notification to alert a user of the client device 110, based on a value of a detected data field. In some embodiments, a rule engine (not shown) may be utilized when performing a check based on a value of a detected data field. In the example above, a rule engine includes a rule that specifies to generate a notification when an 'item price' has a value which is lower than a determined average value of the 'item price' based on a received query result.

In some embodiments, a new web page, which is not the requested web page, may be generated based on the received textual resource and the non-textual resource. This is advantageous, for example, for customizing a web page to a certain user, for example by changing a layout, color scheme, presentation, and the like. In an embodiment, additional content may be received, and the new web page is further generated based on the additional content. Additional content includes, in an embodiment, a text content, an image content, a video content, a combination thereof, and the like.

In certain embodiments, each proxy server 130 is associated with an IP address. The IP address may be associated with a geolocation, such as a country, city, county, and the like. In some embodiments, a web server 140 is configured to provide a request for a resource based on an IP of the client device 110. For example, the web server 140 is configured in an embodiment, to send a client device 110 having a USA-based IP address, content in American English, display prices in US Dollars, etc. The web server 140 is configured, in another embodiment, to send the client device 110 having an Israel-based IP address, content in Hebrew or Arabic, and display prices in Israeli Shekels. When sending a request for a URL through a proxy server 130 to the web server 140, the web server receives the URL request from an IP of the proxy server 130. When the web server 140 is configured to send content based on IP, it may be advantageous to select a proxy server 130 having a certain IP address. In an embodiment, the proxy server 130 is associated with a geolocation which is not a geolocation associated with the client device 110.

In an embodiment, a web server 140 is implemented, for example, as a server, virtual machine, and the like, on which a web server software is deployed. Web server software may be, for example, Apache® HTTP Server, Nginx®, Oracle® HTTP Server, and the like. In certain embodiments, the web server 140 is configured to receive a URL request, for example over HTTP or HTTP secure (HTTPS), and send a resource, such as a content, to a destination specified in the received request. The content may be, for example, an web page coded in HTML. In an embodiment, the web server 140 is configured to determine an IP address of the destination, determine a geolocation of associated with the IP address, and provide a localized content based on the determined geolocation.

Figure 2:
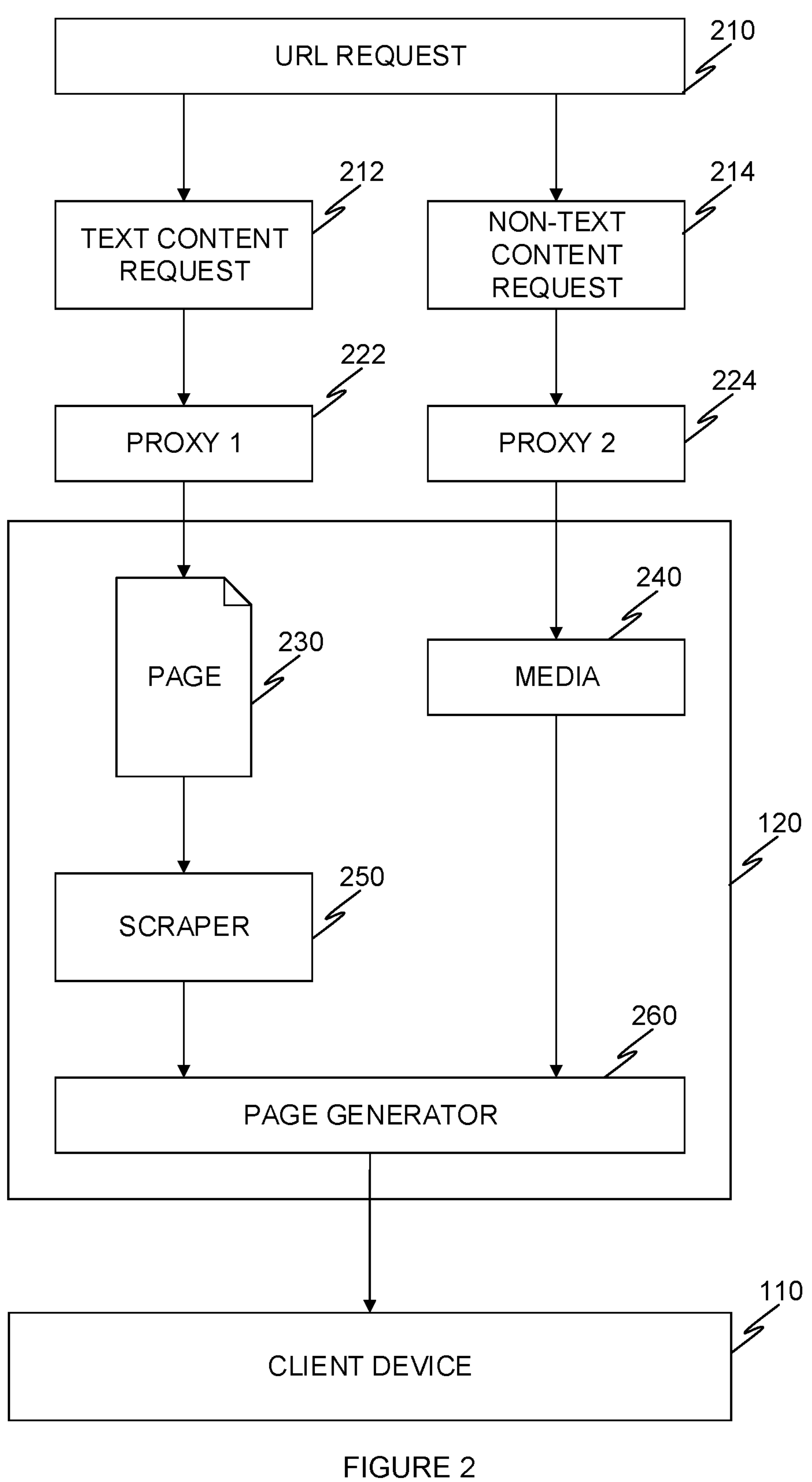
FIG. 2 is a diagram of a URL request processed by a scraping server, implemented according to an embodiment.

FIG. 2 is an example diagram of a URL request processed by a scraping server, implemented according to an embodiment. A URL request 210 may be generated by a client device. In an embodiment, the URL request 210 includes an HTTP method, such as GET, POST, etc., and an HTTP header. An HTTP header is a data field of an HTTP request used for storing metadata related to the HTTP request (or response). For example, an HTTP header may specify what type of media to retrieve (e.g., text, image, and the like). In an embodiment the URL request 210 further includes a source (e.g., an IP of the client device) and a destination (e.g., the IP address of a web server).

The URL request 210 is received by a scraping server 120, which is configured to generate from the URL request 210 a first request for a text content 212 and a second request for a non-text content 214. In an embodiment, a text content 212 is a text document such as an HTML page. In some embodiments, a non-text content 214 is any one of: an image file, a video file, a multimedia file, a digital advertisement, a Word™ file, a PDF file, and the like.

In an embodiment, the scraping server 120 is configured to send the first request to a first proxy server 222, and the second request to the second proxy server 224. In some embodiments, a plurality of first requests may be sent to a first proxy server 222, or to a group of first proxy servers. In certain embodiments a plurality of second requests may be sent to a second proxy server 224, or a group of second proxy servers. In an embodiment a second request is sent to the second proxy server 224, and another second request is sent to another second proxy server, which is not the second proxy server 224. The another second request may be the same as the second request, or be a different second request, which is not a request for text content. In an embodiment a proxy server is a computer system providing a relay, or intermediary, between a client device and a server, such as a web server. Proxy servers may be utilized for a variety of reasons, such as security concerns, privacy concerns, or load balancing network traffic.

In an embodiment, a scraping server 120 may send the first request for text content 212 directly to the web server and circumvent the proxy server. This may be advantageous to reduce latency between the scraping server 120 and the web server. As used herein, latency is a measurement of time between sending a request for content from an endpoint, for example by utilizing a URL request, to the time the content is received by an endpoint. An endpoint for communication may be, for example, the client device, a proxy server, a web server, and the like. In an embodiment, latency is measured utilizing times of processing (i.e., the time it takes a router to process a request), queuing (i.e., how much time a packet spends in a queue), transmission, and propagation.

In an embodiment, the scraping server 120 is configured to request the text content 212 through a network path having the lowest latency. By receiving the web page 230 before receiving the media 240, the scraping server 120 is able to further process the web page 230 without affecting a user's experience which is affected, for example, by increasing latency. Increasing latency is undesirable as even relatively small changes in latency can lead to decreased user satisfaction, resulting in a poor user experience. For example, performing scraping by utilizing a Puppeteer® automation can have a latency of ten to fifteen seconds, while the disclosed technique may reduce that time to two to three seconds, or an order of magnitude in latency terms. Where the goal is to receive a web page, scrape data from the web page, provide additional information and content based on the scraped data, and provide a generated web page to a user, reducing latency is critical in order to preserve the user experience.

In certain embodiments, the scraping server provides the web page 230 to a scraper 250. In an embodiment the scraper 250 is a software application deployed, for example on the scraping server 120, which is configured to extract data from the web page 230. In certain embodiments, extracting data from a web page 230 includes detecting predefined data fields in the web page, detecting values corresponding to the data fields, and storing the detected values, for example in a memory or storage device of the scraping server 120. The detected values may also be referred to as scraped data (i.e., data which is 'scraped' from a web page).

In some embodiments, the scraping server 120 is configured to provide the scraped data to a web page generator 260. In an embodiment, the web page generator 260 is a software application deployed on the scraping server 120. In other embodiment, the web page generator 260 is deployed as an agent on a client device 110. For example, the web page generator 260 may be deployed as a plugin on a web browser application of the client device 110. In an embodiment, the scraped data may be used to generate, detect, or otherwise provide additional content. For example, scraped data may include a numerical value corresponding to a price from the scraped web page 230. The value may be compared, for example, by querying a database containing historical price data, to a historical value, average value, and the like. In an embodiment, the historical data may be provided as additional content. In some embodiments, a conditional rule may be applied when generating the additional content. For example, a rule may specify that when the detected (i.e., scraped) value is higher than the determined average value, an additional content is generated which includes a recommendation to not purchase the article displayed in the web page.

The web page generator 260 is configured, in an embodiment, to generate a web page based on scraped data received from the scraper 250, media 240, additional content, and combinations thereof.

Figure 3:
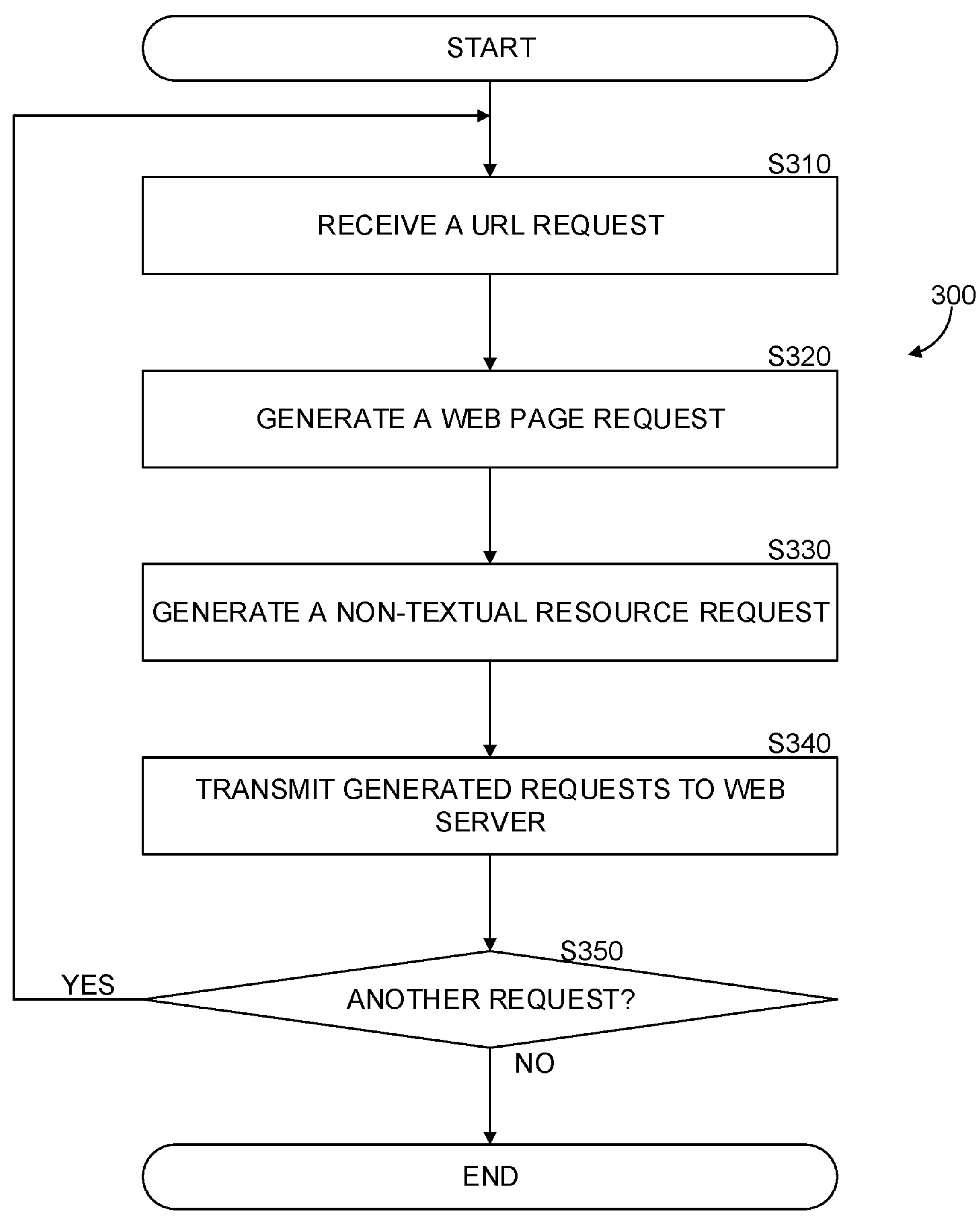
FIG. 3 is a flowchart of a method for generating requests for near real time data scraping from a web page, implemented according to an embodiment.

FIG. 3 is an example flowchart of a method for generating requests for near real time data scraping from a web page, implemented according to an embodiment. It is recognized that real time and near real time have different definitions in computing applications and web applications. For the purpose of this disclosure, real time are computer actions such as sending data, receiving data, displaying data, and the like, which occur within a real-time constraint, or otherwise without significant delay. In this regard, significant delay may be measured as impact on user experience, where a user feels that loading a web page is taking too long, usually over two seconds, for example. Near real time is a time frame typically longer than real time, but less than an order of magnitude greater. For example, if real time is up to one second, near real time is less than ten seconds. In an embodiment, near real time is less than five seconds; in other embodiments it is less than three seconds.

At S310, a URL request is received. In an embodiment, the URL request is received over HTTP and includes an HTTP request, such as GET, POST, and the like. In an embodiment the URL request further includes a header which provides metadata on the URL request. The URL request includes a source (e.g., a client device), a destination (e.g., web server), and a resource identifier. A resource identifier may be, for example, a web address, including a host name, domain, path, and the like. In an embodiment, the URL request includes a request for a textual content, such as a web page, and a request for a non-textual content, such as a media file, image file, video file, and the like. In an embodiment, a textual resource is detected in the URL request, and a non-textual resource is detected in the URL request. Detecting a textual resource includes, according to an embodiment, detecting a request for HTML code. Detecting a non-textual resource includes, for example, detecting a request for an image file, video file, stylesheet, and the like, for example in an HTML code.

At S320, a web page request is generated based on the received URL request. In an embodiment, the web page request is a request for receiving a textual resource, for example an HTML based web page. In an embodiment, the web page request may be sent directly to a web server, or though a proxy server. For example, an address of the web server may be determined from the destination field of the received URL request.

At S330, a non-textual resource request is generated based on the received URL request. In an embodiment, the URL request includes requests for text resources, such as web pages, text files, and the like, and requests which are for resources which are not textual, such as image files, video files, media files, and the like. In certain embodiments, requests are split into groups based on their type of content, such as textual and non-textual. In other embodiments, requests are split into groups based on content as textual content, image content, video content, and the like. In an embodiment, textual content is requested through a first network path, while non-textual content is requested through a second path, where the second network path has a latency which is larger than the latency of the first network path.

In certain embodiments, a portion of the non-textual content is filtered out. For example, a JavaScript code, an image, a video, a multimedia, a font, an Ajax request, combinations thereof, and the like, may be filtered out of the non-textual content request. This is advantageous as decreasing the requested content means that a webpage will load faster since the less content is requested the faster a page can load the content which is requested, as the webpage is loaded once all content is received. Content which is filtered out is content for which a request to fetch is not generated.

In some embodiments, the average latency of the first network path is shorter than the average latency of the second network path. In certain embodiments, a plurality of second network paths are utilized, each second network path having a latency which is longer than the latency of the first network path. In some embodiments, a network path includes any one of: a client device (origin endpoint), a scraping server, a proxy server, and a web server (destination endpoint). In certain embodiments, the non-textual resource request is further generated based on a determined latency of a network path, wherein the network path includes the web server as a destination endpoint.

At S340, the generated requests are transmitted. In an embodiment, transmitting a generated request includes sending a generated request based on a network path to a web server. The network path includes, in an embodiment, a proxy server.

At S350, a check is performed to determine if additional URL requests are received. If 'yes', execution continues at S310. In some embodiments, if 'no' execution may terminate. In certain embodiments, execution continues by scraping received content and generating a new or modified content, which is discussed in more detail below.

Figure 4:
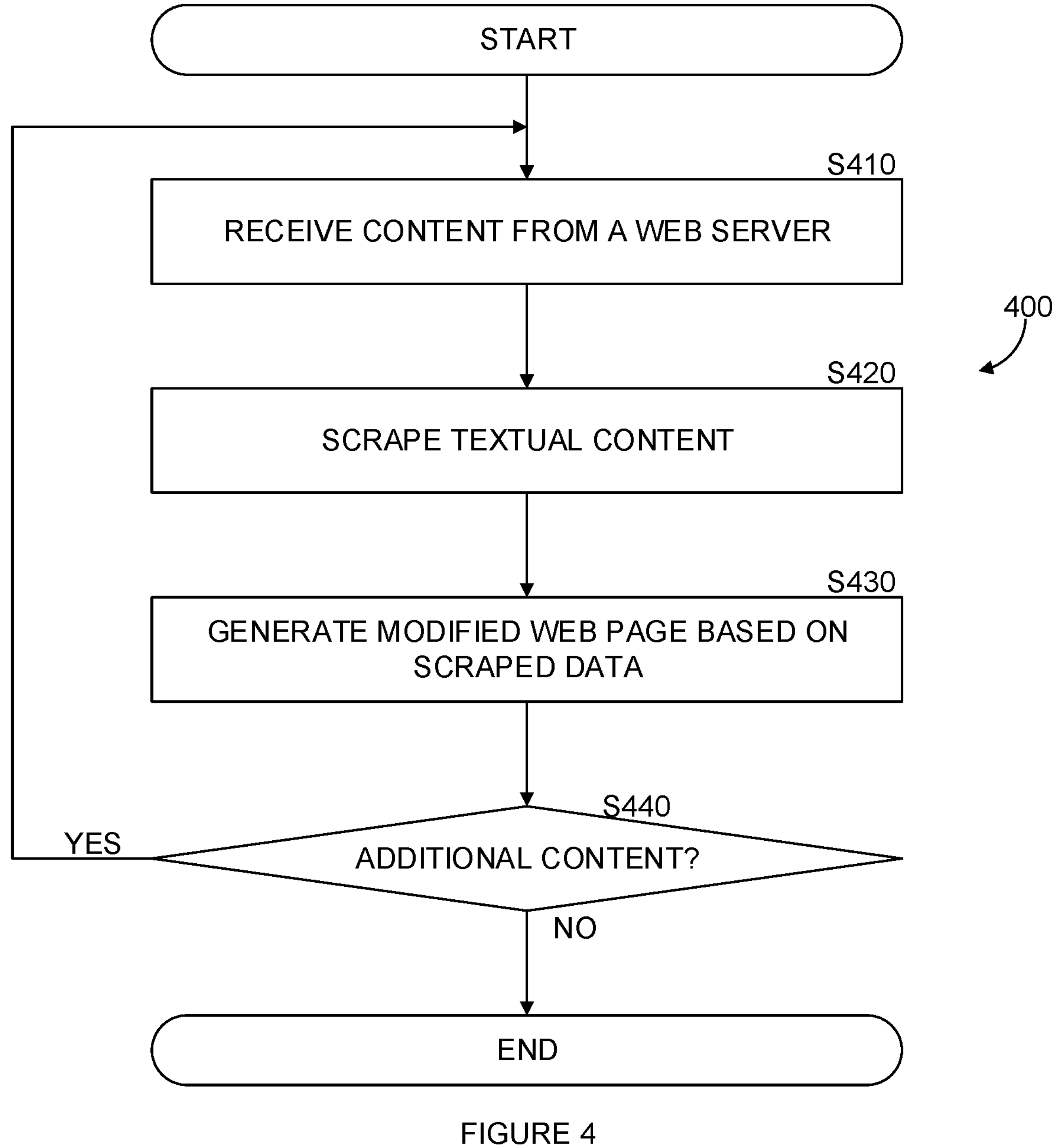
FIG. 4 is a flowchart of a method for generating a modified web page from scraped content, implemented according to an embodiment.

FIG. 4 is an example of a flowchart 400 of a method for generating a modified web page from scraped content, implemented according to an embodiment.

At S410, content is received. In an embodiment, the content is received from a web server in response to a request for textual content, and a request for non-textual content, the requests generated for example utilizing the method described in more detail above. In certain embodiments, the textual content is received over a first network path, and the non-textual content is received over a second network path, which is not the first network path. Content includes textual content and non-textual content.

At S420, the textual content is scraped. In an embodiment, scraping textual content includes extracting data from a text based resource, such as an HTML web page. In certain embodiments, extracting data from a web page includes detecting predefined data fields in the web page, detecting values corresponding to the data fields, and storing the detected values. The detected values may also be referred to as scraped data (i.e., data which is 'scraped' from a web page). In some embodiments, scraping the textual content is performed in response to detecting a DOMContentLoaded event. A DOMcontentLoaded event is generated when an HTML document has been loaded and parsed, but other content (i.e., non-textual content) such as stylesheets, images, videos, subframes, and the like, have not loaded. For example, if the other content has not yet been received, then the content is not loaded. A fully loaded page, including textual and non-textual content triggers a load event. In other embodiments, similar document object model (DOM) events may be used to trigger scraping, for example by indicating that the textual resource is ready (i.e., fully received), regardless of the state of the non-textual resource.

At S430, a modified web page is generated. In an embodiment, an instruction to generate a modified web page is generated. In some embodiments, the modified web page is generated based on the received content, and the extracted data. In certain embodiments the modified web page includes a web page requested by an original URL with an overlay generated on the web page. In some embodiments, the modified web page is a new web page, which is generated based on the received content, the extracted data, additional data, and combinations thereof. Additional data may be generated, or detected, for example based on the extracted data. For example, scraped data may include a numerical value corresponding to a price from a scraped web page. The value may be compared, for example, by querying an external database, such as a database containing historical price data, to a historical value, average value, and the like, which is received as a result in response to querying the database.

In an embodiment, the historical data may be provided as additional content. In some embodiments, a conditional rule may be applied when generating the additional content. For example, a rule may specify that when the detected (i.e., scraped) value is higher than the determined average value, an additional content is generated which includes a recommendation to not purchase the article displayed in the web page. Alternatively in an embodiment when the value is detected to be within a predetermined threshold, predetermined value, and the like, a notification is generated to indicate that this is a good value for the user.

At S440, a check is performed to determine if another content should be received. If 'yes' execution continues at S410; otherwise, in an embodiment, execution terminates.

Figure 5:
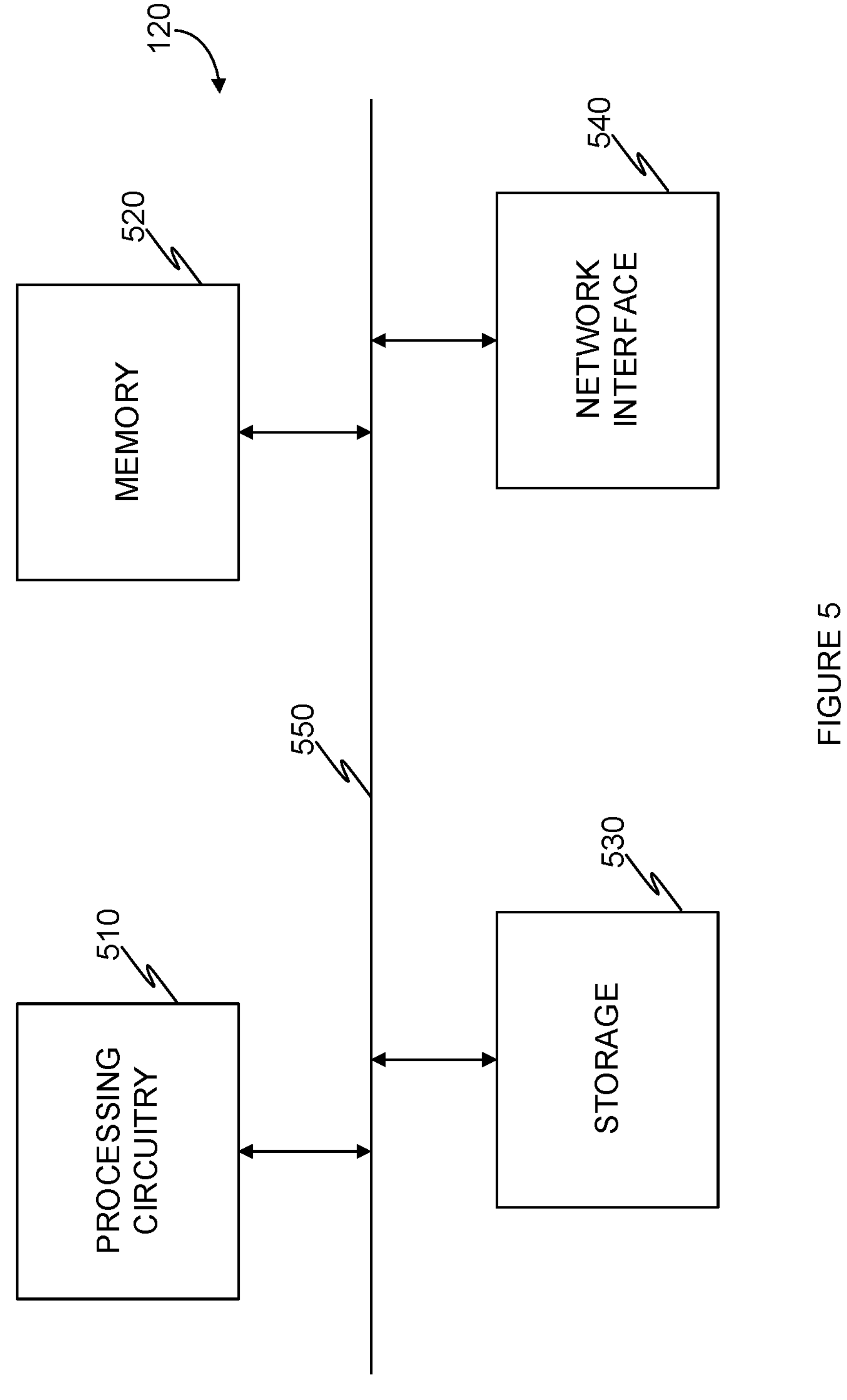
FIG. 5 is a schematic diagram of a scraping server according to an embodiment.

FIG. 5 is an example schematic diagram of a scraping server 120 according to an embodiment. The scraping server 120 includes a processing circuitry 510 coupled to a memory 520, a storage 530, and a network interface 540. In an embodiment, the components of the scraping server 120 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 540 allows the scraping server 120 to communicate with, for example, a software agent 112, a proxy server 130, a web server 140, and the like.

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for near real time scraping of a web page to generate a modified web page, comprising:
- receiving a uniform resource locator (URL) request directed at a web server;
- detecting in the URL request a textual resource and a non-textual resource;
- generating a request for the textual resource over a first network path including a first determined latency;
- generating a request for the non-textual resource over a second network path including a second determined latency, which is greater than the first determined latency, wherein the second network path is different from the first network path;
- receiving the textual resource;
- scraping data from the textual resource prior to receiving the non-textual resource; and
- generating a modified web page based on the scraped data, the textual resource, and the non-textual resource.

2. The method of claim 1, wherein the second network path includes a proxy server, the proxy server associated with a geolocation which is not a geolocation of a client device from which the URL request originates.

3. The method of claim 1, wherein scraping is performed in response to detecting a document object model (DOM) event.

4. The method of claim 3, wherein the DOM event indicates that the textual resource is received.

5. The method of claim 1, wherein the non-textual resource is any one of: an image, a video, a stylesheet, a media file, and any combination thereof.

6. The method of claim 1, further comprising:
detecting a predefined data field in the textual resource; and
detecting a value corresponding to the predefined data field.

7. The method of claim 6, further comprising:
generating the modified web page further based on the detected value.

8. The method of claim 6, further comprising:
querying an external database based on the detected value.

9. The method of claim 8, further comprising:
generating an additional content for the modified web page based on a result received in response to executing the query on the external database.

10. The method of claim 1, further comprising:
filtering a content from the non-textual resource, wherein the filtered content is not requested in the generated requests.

11. The method of claim 10, wherein the content is any one of: a JavaScript code, an image, a video, a multimedia, a font, an Ajax request, and a combination thereof.

12. The method of claim 1, wherein the first network path is based on a first geolocation, and the second network path is based on a second geolocation.

13. A non-transitory computer readable medium having stored thereon instructions for causing a processing circuitry to execute a process, the process comprising:
receiving a uniform resource locator (URL) request directed at a web server;
detecting in the URL request a textual resource and a non-textual resource;
generating a request for the textual resource over a first network path including a first determined latency;
generating a request for the non-textual resource over a second network path including a second determined latency, which is greater than the first determined latency, wherein the second network path is different from the first network path;
receiving the textual resource;
scraping data from the textual resource prior to receiving the non-textual resource; and
generating a modified web page based on the scraped data, the textual resource, and the non-textual resource.

14. A system for near real time scraping of a web page to generate a modified web page, comprising:
a processing circuitry; and
a memory, the memory containing instructions that, when executed by the processing circuitry, configure the system to:
receive a uniform resource locator (URL) request directed at a web server;
detect in the URL request a textual resource and a non-textual resource;
generate a request for the textual resource over a first network path including a first determined latency;
generate a request for the non-textual resource over a second network path including a second determined latency, which is greater than the first determined latency, wherein the second network path is different from the first network path;
receive the textual resource;
scrape data from the textual resource prior to receiving the non-textual resource; and
generate a modified web page based on the scraped data, the textual resource, and the non-textual resource.

15. The system of claim 14, wherein the second network path includes a proxy server, the proxy server associated with a geolocation which is not a geolocation of a client device from which the URL request originates.

16. The system of claim 14, wherein the memory contain further instructions which when executed by the processing circuitry further configure the system to:
scrape data in response to detecting a document object model (DOM) event.

17. The system of claim 16, wherein the DOM event indicates that the textual resource is received.

18. The system of claim 14, wherein the non-textual resource is any one of:
an image, a video, a stylesheet, a media file, and any combination thereof.

19. The system of claim 14, wherein the memory contain further instructions which when executed by the processing circuitry further configure the system to:
detect a predefined data field in the textual resource; and
detect a value corresponding to the predefined data field.

20. The system of claim 19, wherein the memory contain further instructions which when executed by the processing circuitry further configure the system to:
generate the modified web page further based on the detected value.

21. The system of claim 19, wherein the memory contain further instructions which when executed by the processing circuitry further configure the system to:
query an external database based on the detected value.

22. The system of claim 21, wherein the memory contain further instructions which when executed by the processing circuitry further configure the system to:
generate an additional content for the modified web page based on a result received in response to executing the query on the external database.

23. The system of claim 14, wherein the memory contain further instructions which when executed by the processing circuitry further configure the system to:
filter a content from the non-textual resource, wherein the filtered content is not requested in the generated requests.

24. The system of claim 23, wherein the content is any one of: a JavaScript code, an image, a video, a multimedia, a font, an Ajax request, and a combination thereof.

25. The system of claim 14, wherein the first network path is based on a first geolocation, and the second network path is based on a second geolocation.

* * * * *